(12) United States Patent
Glaser

(10) Patent No.: US 9,090,463 B2
(45) Date of Patent: Jul. 28, 2015

(54) METHOD FOR PRODUCING GAS PRODUCTS FROM SYNGAS

(75) Inventor: Jurgen Glaser, Wolfratshausen (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/111,199

(22) PCT Filed: Apr. 5, 2012

(86) PCT No.: PCT/EP2012/001528
§ 371 (c)(1),
(2), (4) Date: Oct. 24, 2013

(87) PCT Pub. No.: WO2012/139740
PCT Pub. Date: Oct. 18, 2012

(65) Prior Publication Data
US 2014/0034878 A1    Feb. 6, 2014

(30) Foreign Application Priority Data
Apr. 12, 2011   (DE) .......................... 10 2011 016 789

(51) Int. Cl.
*C01B 3/02* (2006.01)
*C01B 3/32* (2006.01)
(Continued)

(52) U.S. Cl.
CPC ... *C01B 3/32* (2013.01); *B01J 7/00* (2013.01); *C01B 3/36* (2013.01); *C01B 3/48* (2013.01); *C10J 3/00* (2013.01); *C10K 1/004* (2013.01); *C10K 1/005* (2013.01); *C10K 1/165* (2013.01); *C10K 1/32* (2013.01); *C10K 3/04* (2013.01); *C01B 2203/0255* (2013.01); *C01B 2203/0283* (2013.01); *C01B 2203/043* (2013.01); *C01B 2203/047* (2013.01); *C01B 2203/0415* (2013.01); *C01B 2203/0475* (2013.01); *C01B 2203/0495* (2013.01); *C01B 2203/1247* (2013.01);
(Continued)

(58) Field of Classification Search
CPC ........................................................ C01B 3/32
USPC ........................................................ 423/648.1
See application file for complete search history.

(56) References Cited

U.S. PATENT DOCUMENTS

| 6,783,749 B2 | 8/2004 | Narasimhan et al. |
| 2003/0208960 A1 | 11/2003 | Narasimhan et al. |

(Continued)

FOREIGN PATENT DOCUMENTS

EP    1364911 A1    11/2003

OTHER PUBLICATIONS

International Search Report for PCT/EP2012/001528 (Jun. 21, 2012).

*Primary Examiner* — Paul Wartalowicz
(74) *Attorney, Agent, or Firm* — Millen, White, Zelano & Branigan, P.C.

(57) ABSTRACT

The invention relates to a method and a device for recovering a first gas product (13) consisting essentially of hydrogen and a second gas product (12) containing hydrogen and carbon monoxide, wherein a synthesis gas (4) generated by partial oxidation (POX) from a production substance (3) containing a coal and/or heavy oil is transformed by conversion (S) and subsequent drying and the removal of acid gases (A) into a hydrogen-rich gas mixture (6), which in turn is decomposed into a hydrogen fraction (7) of product purity and a residue gas (8) containing hydrogen and carbon monoxide. According to the invention, at least a part (10) of the residue gas (8) containing hydrogen and carbon monoxide is used to recover the second gas product (12).

7 Claims, 1 Drawing Sheet

(51) Int. Cl.
  *C01B 3/36* (2006.01)
  *C01B 3/48* (2006.01)
  *C10J 3/00* (2006.01)
  *C10K 1/00* (2006.01)
  *C10K 1/32* (2006.01)
  *C10K 3/04* (2006.01)
  *C10K 1/16* (2006.01)
  *B01J 7/00* (2006.01)

(52) U.S. Cl.
  CPC .... *C01B2203/1288* (2013.01); *C10J 2300/093* (2013.01); *C10J 2300/0959* (2013.01); *C10J 2300/0976* (2013.01); *C10J 2300/1838* (2013.01); *C10J 2300/1846* (2013.01)

(56) References Cited

U.S. PATENT DOCUMENTS

2009/0246118 A1  10/2009  Drnevich et al.
2011/0085966 A1  4/2011  Vauk et al.

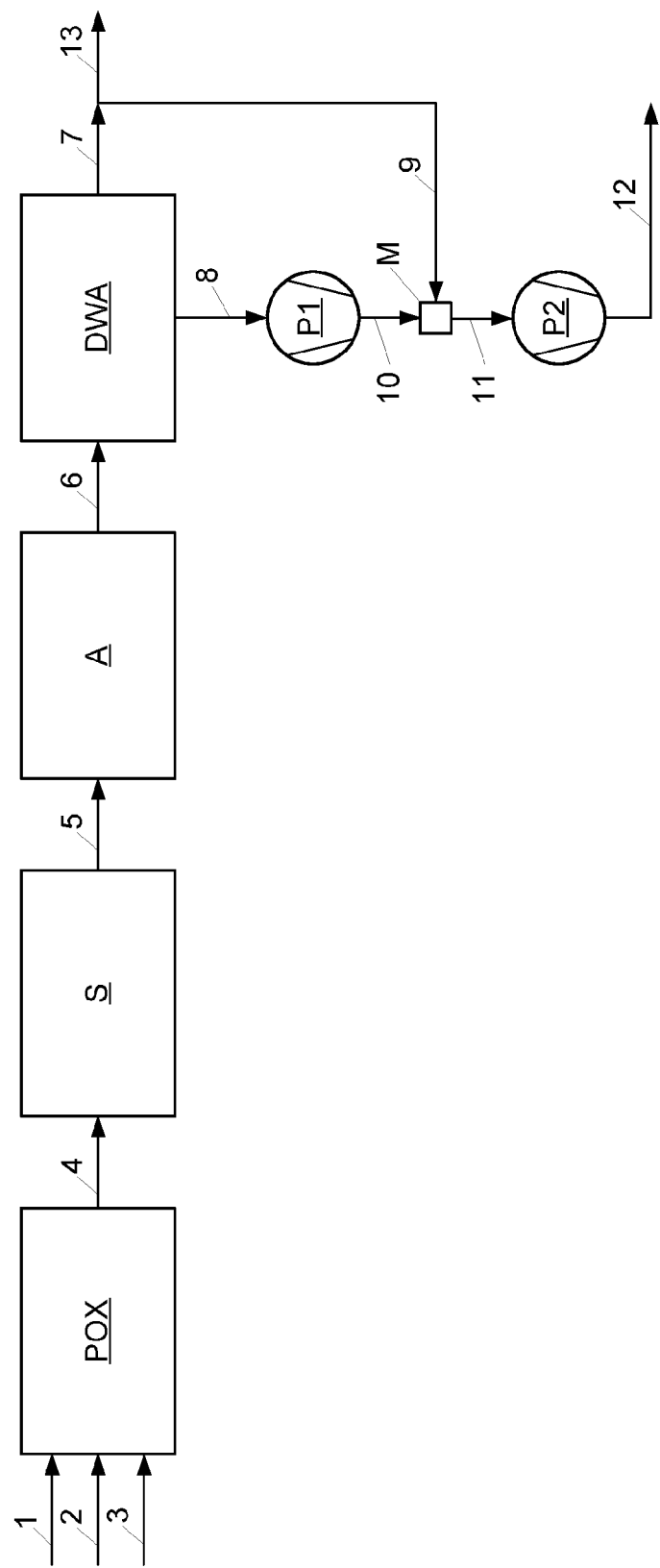

METHOD FOR PRODUCING GAS PRODUCTS FROM SYNGAS

The invention relates to a method for recovering a first gas product consisting essentially of hydrogen and a second gas product containing hydrogen and carbon monoxide, wherein a synthesis gas generated by partial oxidation from a production substance containing a coal and/or heavy oil is transformed by conversion followed by drying and the removal of acid gases into a hydrogen-rich gas mixture, which in turn is decomposed into a hydrogen fraction of product purity and a residue gas containing hydrogen and carbon monoxide.

The invention further relates to a device for carrying out the method.

Most hydrogen is produced on an industrial scale by gasification of production substances that contain carbon. One gasification process that is used widely in the industry is partial oxidation (POX), by which "synthesis gases" are generated from hydrocarbons—particularly from hydrocarbons with higher boiling point—or coal. In this context, the generally preheated production substance is reacted with water vapour and an oxidising agent in a reaction chamber at temperatures between 1300 and 1500° C. and under pressures up to 100 bar to produce a raw synthesis gas, which is composed mostly of hydrogen, carbon monoxide, carbon dioxide and water. The heat required for the reaction is generated by incomplete (partial) oxidation of the hydrocarbons in the product substance, and for this purpose oxygen is fed into the reaction chamber in a quantity that is insufficient to fully transform the processing materials.

In order to increase the hydrogen component, the synthesis gas undergoes a conversion during which the carbon monoxide is reacted with water in the presence of a catalyst to form carbon dioxide and hydrogen. Following the conversion, carbon dioxide and other acid gases are separated from the converted gas, in a methanol scrubber, for example, thereby yielding a hydrogen-rich gas mixture, which however does not have the requisite purity of over 99% by volume for a hydrogen product. According to the prior art, therefore, the hydrogen-rich gas mixture is forwarded to a cryogenic gas separation plant, for example, in which a hydrogen product that is pure enough for many applications and a hydrogen-poor residual gas are produced.

Frequently, the purpose of the process is to produce an "oxogas" as well as the hydrogen product, oxogas being a mixture of hydrogen, carbon monoxide and possibly also carbon dioxide in defined proportions. One example of an oxogas is methanol synthesis gas, which consists of hydrogen ($H_2$), carbon monoxide (CO) and carbon dioxide ($CO_2$), wherein the stoichiometric number S thereof, calculated from the molar concentrations $[H_2]$, $[CO]$ and $[CO_2]$ of the components using the equation $S=([H_2]-[CO_2])/([CO]+[CO_2])$, has a value of about 2.

According to the prior art, a portion of the synthesis gas is diverted before conversion in order to produce the oxogas and is dried and separated from acid gases, in a physical gas scrubber for example, in a separate treatment process. The stoichiometric number S of the gas mixture obtained in this manner usually will usually have a value that is lower than the number required for the oxogas. In order to adjust S, hydrogen is therefore diverted from the hydrogen fraction having product purity and added to the gas mixture. If the objective is to produce an oxogas that contains carbon dioxide, carbon dioxide is not completely removed from the synthesis gas during the acid gas separation step.

The facilities that are required to process the portion of synthesis gas that is diverted for generating the oxogas are associated with considerable investment costs, which assume even greater significance when the quantity of oxogas produced is lower compared with the quantity of the hydrogen product. If the quantity of hydrogen product is more than four times greater than the oxogas yield, experience has shown that the process is not economically viable.

The object of the present invention is therefore to describe a method and a device of the type described in the introduction that overcome the drawbacks of the prior art.

The stated object is solved according to the invention in terms of the process in that at least a portion of the residual gas that contains hydrogen and carbon monoxide is used in the recovery of the second gas product containing hydrogen and carbon monoxide.

The residue gas usually contains all of the components that are also present in the hydrogen-rich gas mixture to be decomposed, from which it is separated, but the composition thereof is different. If the hydrogen-rich gas mixture contains carbon monoxide and carbon dioxide in addition to hydrogen, the residue gas will also contain these substances, although the hydrogen content is significantly lower and the carbon monoxide and carbon dioxide contents are considerably higher. Such a residue gas may already have the composition of an oxogas that can be exploited economically, or it may be processed to yield an oxogas, for example by removing the carbon dioxide and/or adding hydrogen.

One variation of the method according to the invention provides that residue gas is mixed with a portion of the hydrogen fraction having product purity to produce the second gas product. The second gas product is preferably a methanol synthesis gas.

It is further suggested to carry out the conversion and/or acid gas removal in such manner that a hydrogen-rich gas mixture with a defined content of carbon monoxide and/or carbon dioxide is produced. In this way, it is possible to control the composition and quantity of the residue gas. The composition of the hydrogen-rich gas mixture is preferably adjusted such that the composition of the residue gas yielded therefrom is equivalent to that of an economically exploitable oxogas. To this end, conversion may be carried out in two steps, wherein the synthesis gas is separated into a first and a second substream following a first conversion step. In order reduce the carbon monoxide concentration, the first substream is then subjected to further conversion in a second step, while the second substream is finally merged with the gas mixture obtained in the second conversion step to yield a partially converted gas mixture. In this context, the volume of the two substreams is regulated so that the hydrogen/carbon monoxide ratio in the partially converted gas mixture satisfies requirements.

If carbon dioxide is required in the second gas product, which contains hydrogen and carbon monoxide, carbon dioxide may be removed from the converted gas mixture only incompletely and to an adjustable degree in the acid gas removal phase. Acid gas is preferably removed by a physical gas scrubber, in which particularly preferably cryogenic methanol is used as the physically acting scrubbing agent. Gas scrubbers of such kind may be operated with a "$CO_2$ slip", by which means carbon dioxide is removed from the gas mixture to be scrubbed less thoroughly than is technically possible, and the carbon dioxide content of the scrubbed gas is adjusted to a predefined value.

The hydrogen-rich gas mixture obtained by the removal of acid gases preferably undergoes a pressure swing adsorption process as a result of which a hydrogen fraction having product purity is separated and a residue gas containing hydrogen is produced. However, it is also possible to break the gas mixture down in a cryogenic process. At least a partial quantity of the hydrogen fraction is the first product released at the system boundary.

The invention further relates to a device for recovering a first gas product, which consists essentially of hydrogen, and a second gas product, which contains hydrogen and carbon monoxide, with a gasification device in which a synthesis gas may be generated from a production substance containing coal and/or a heavy oil by partial oxidation, a conversion reactor in which the synthesis gas may be undergo conversion, apparatuses for removing water and acid gases from the gas mixture that is obtained by conversion, and a decomposition device in which the gas mixture obtained by removing water and acid gases may be decomposed into a hydrogen fraction having product purity and a residue gas that contains hydrogen.

In terms of the device, the stated object is solved in that it comprises a device for processing the residue gas, in which device the second gas product, containing hydrogen and carbon monoxide, may be produced from the residue gas.

The device for processing the residue gas may include for example a separating device, in which components may be separated from the residue gas. It preferably comprises a mixing device, into which the residue gas may be fed, and to which a portion of the hydrogen fraction having product purity may be added in controlled quantities.

The device according to the invention preferably comprises a conversion device, in which a gas mixture having a defined carbon monoxide content may be produced. For example, the conversion device comprises a first conversion reactor and a second conversion reactor arranged in series therewith, wherein in the first conversion reactor the entire quantity of synthesis gas may undergo a conversion in which a first converted gas mixture is obtained. A regulating apparatus in which the first converted gas mixture may be divided into a first and a second substream is arranged downstream from the first conversion reactor. While the first substream may be fed to the second conversion reactor and converted to a second converted gas mixture therein, the second substream may be transported past the second conversion reactor via a bypass line, and combined with the second converted gas mixture to yield a partially converted gas mixture. The parameters of the two substreams may be controlled via the regulating device in such manner that the proportions of hydrogen and carbon monoxide in the partially converted gas mixture satisfy requirements.

In one variation of the device according to the invention, an apparatus for removing acid gases is provided that enables the degree of carbon dioxide removal to be adjusted. The apparatus for removing acid gases is preferably a physical gas scrubber, in which particularly preferably cryogenic methanol may be used as the physically acting scrubbing agent.

The decomposition apparatus of the device according to the invention may be in the form of a cryogenic gas decomposition apparatus, for example. However, it is preferably a pressure swing adsorber.

The invention makes it possible to produce an oxogas as a product in addition to a hydrogen product with little or no additional expense. The invention may be used particularly advantageously whenever the required quantity of the hydrogen product is significantly greater than that of the oxogas.

In the following, the invention will be explained in greater detail with reference to an embodiment thereof represented diagrammatically in FIG. 1.

FIG. 1 shows a device for producing a hydrogen product and an oxogas from coal and/or heavy oil.

Processing substances are fed in the form of oxygen via line 1, water vapour via line 2, and coal or heavy oil or a mixture of coal and heavy oil via line 3 to gasification apparatus POX. In the reaction chamber of gasification apparatus POX, the processing substances are transformed into a synthesis gas 4 containing water, hydrogen and also carbon monoxide and acid gases by partial oxidation. Synthesis gas 4 is forwarded to conversion reactor S, where a controlled quantity of carbon monoxide reacts to completion with water, yielding hydrogen and carbon dioxide in a two-stage conversion process, so that a stream 5 with a defined ratio of hydrogen/carbon monoxide may be drawn off. In order to remove water and acid gases, stream 5 is fed into acid gas scrubber A—which is a methanol scrubber for example—in which a hydrogen-rich gas mixture 6 that also contains carbon monoxide is recovered. Gas mixture 6 is fed to pressure swing adsorber DWA, where it is separated adsorptively into a hydrogen fraction 7 with product purity and a residue gas 8 containing carbon monoxide and hydrogen, which already has a composition similar to that of an oxogas. A small portion of hydrogen fraction 7 is diverted via line 9 and introduced in metered quantities into mixing apparatus M together with the compressed residue gas 10 that has been compressed in compressor P1, and these are combined to yield the oxogas 11 having the composition of the product. After compression P2, oxogas 11 as well as the remainder 13 of the hydrogen fraction 7, is forwarded to the system boundary as product 12.

The invention claimed is:

1. A method for recovering a first gas product (13) consisting essentially of hydrogen and a second gas product (12) containing hydrogen and carbon monoxide, said method comprising:
   generating a synthesis gas (4) by partial oxidation (POX) from a production substance (3) containing a coal and/or heavy oil,
   transforming said synthesis gas by conversion (S), followed by drying and removal of acid gases (A), to form a hydrogen-rich gas mixture (6), and
   decomposing the hydrogen-rich gas mixture (6) into a hydrogen fraction (7) of product purity and a residue gas (8) containing hydrogen and carbon monoxide,
   wherein at least a part (10) of the residue gas (8) containing hydrogen and carbon monoxide is used to recover the second gas product (12) containing hydrogen and carbon monoxide, and
   wherein said at least a part (10) of said residue gas (8) containing hydrogen and carbon monoxide is mixed with a part (9) of the hydrogen fraction (7) having product purity in order to produce the second gas product (12), and wherein the remainder of hydrogen fraction (7), after part (9) is removed, forms said first gas product (13).

2. The method according to claim 1, wherein, in said partial oxidation (POX), oxygen, water vapor, and coal and/or heavy oil are transformed by partial oxidation into a synthesis gas containing water, hydrogen, carbon monoxide and acid gases.

3. The method according to claim 2, wherein, in said conversion (S), carbon monoxide and water of said synthesis gas are reacted to form a stream (5) having a defined ratio of hydrogen/carbon monoxide, and said stream (5) having a defined ratio of hydrogen/carbon monoxide is fed into acid gas scrubber (A) for said removal of acid gases thereby forming said hydrogen-rich gas mixture (6) which also contains carbon monoxide.

4. The method according to claim 3, wherein said hydrogen-rich gas mixture (6) which also contains carbon monoxide is fed to pressure swing adsorber DWA, where it is separated adsorptively into said hydrogen fraction 7 with product purity and said residue gas (8) containing carbon monoxide and hydrogen.

5. The method according to claim 4, wherein said residue gas (8) containing carbon monoxide and hydrogen is compressed in a compressor (P1), and a portion of said hydrogen fraction (7) is introduced in metered quantities into mixing apparatus M together with the compressed residue gas containing carbon monoxide and hydrogen and combined therein to yield said second gas product (12).

6. The method according to claim 1, wherein the acid gas removal (A) carbon dioxide is only incompletely removed from the partly converted gas mixture (5) and is separated to an adjustable degree of separation.

7. The method according to claim 1, wherein the second gas product is a methanol synthesis gas.

* * * * *